L. WILLIS.
RIDING CULTIVATOR.
APPLICATION FILED OCT. 25, 1915.
1,184,502.
Patented May 23, 1916.
4 SHEETS—SHEET 4.
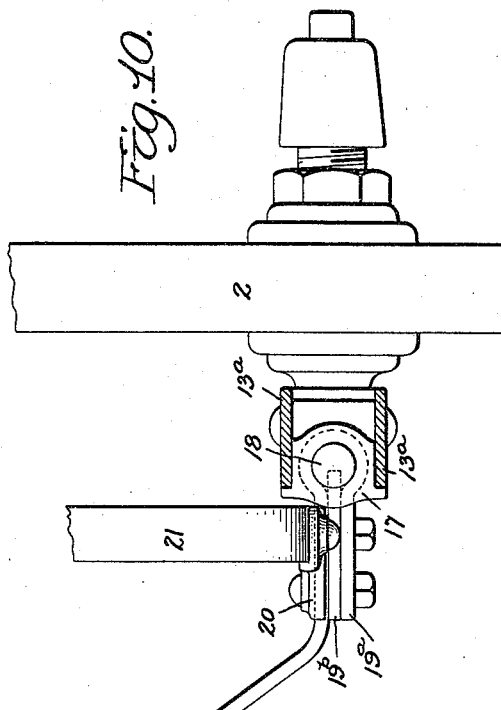
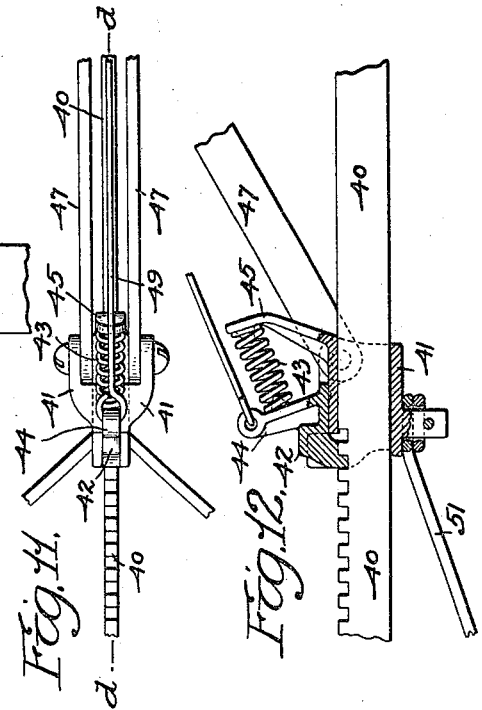
INVENTOR
LELAND WILLIS
BY HIS ATTORNEY
Harry Smith

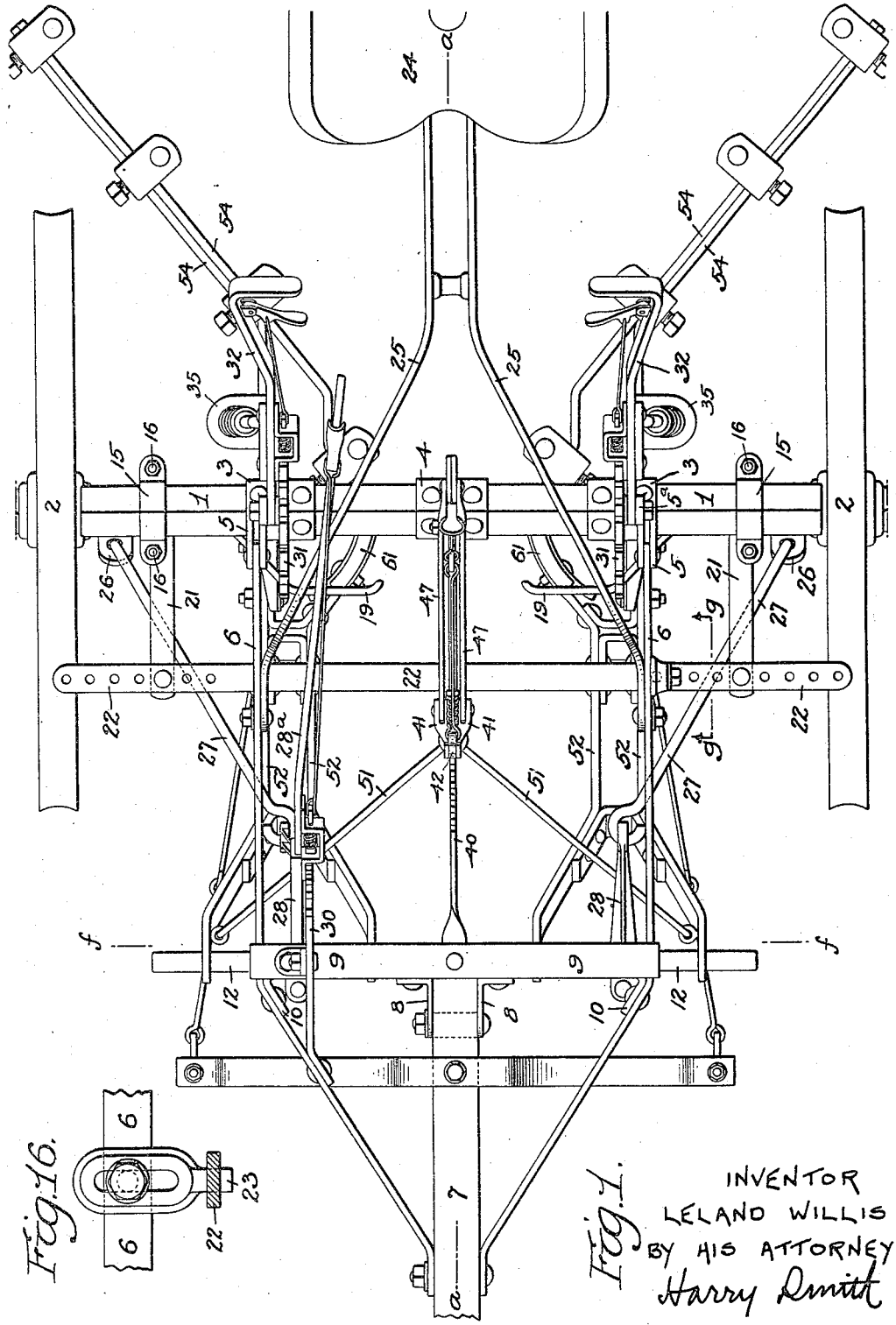

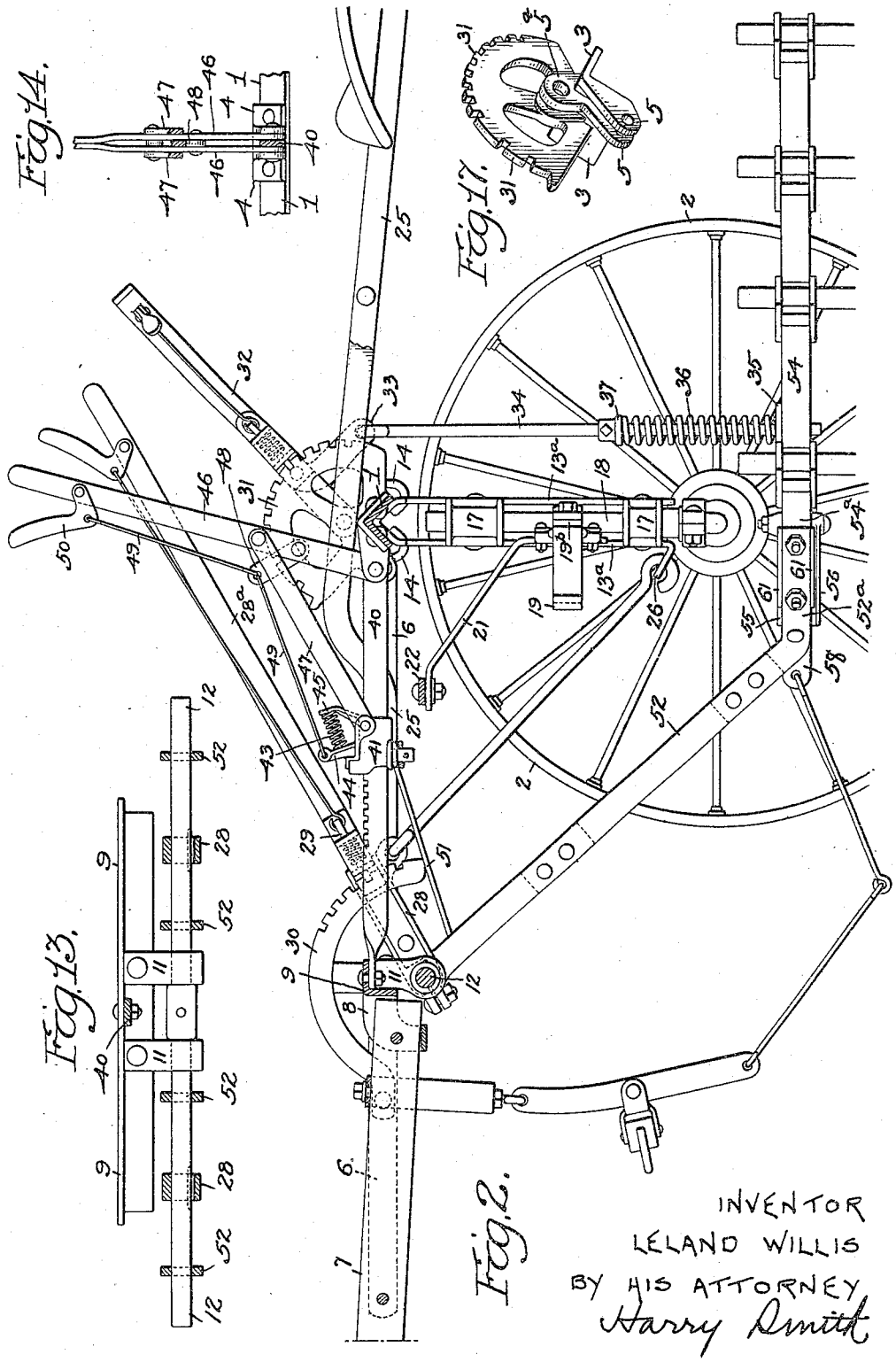

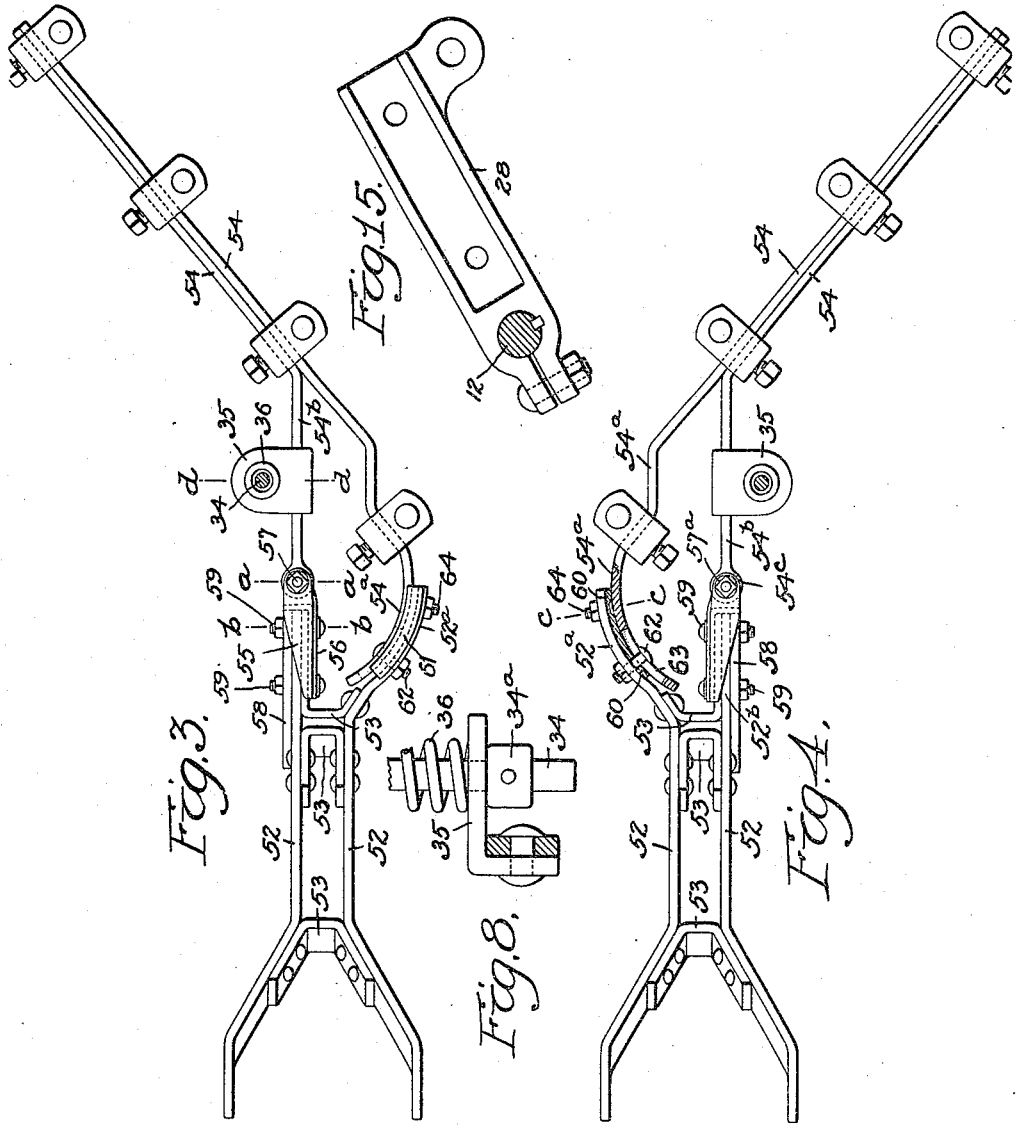

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

RIDING-CULTIVATOR.

1,184,502.  Specification of Letters Patent.  Patented May 23, 1916.

Application filed October 25, 1915. Serial No. 57,741.

*To all whom it may concern:*

Be it known that I, LELAND WILLIS, a citizen of the United States, residing in Grenloch, New Jersey, have invented certain Improvements in Riding-Cultivators, of which the following is a specification.

My invention consists of certain improvements in riding cultivators of a recognized type, my invention comprising certain structural details of such a cultivator, devised with the view of increasing the strength and durability of the same and simplifying and cheapening its manufacture, by permitting of the employment, in such manufacture, of rolled metal rods or bars together with a few simple castings, the use of wood being practically dispensed with.

In the accompanying drawings—Figure 1 is a top view of sufficient of a riding cultivator of the type to which my invention relates to illustrate those features constituting the subject of my invention; Fig. 2 is a longitudinal section illustrating in elevation mechanism on the right hand side of the cultivator; Figs. 3 and 4 are top views, respectively, of the right and left hand cultivator gang-frames; Fig. 5 is a transverse section, on an enlarged scale, on the line $a$—$a$, Fig. 3; Fig. 6 is a similar transverse section on the line $b$—$b$, Fig. 3; Fig. 7 is a similar transverse section on the line $c$—$c$, Fig. 4; Fig. 8 is an enlarged view, partly in elevation and partly in transverse section, on the line $d$—$d$, Fig. 3; Fig. 9 is a rear elevation, on an enlarged scale, of part of one of the wheels of the cultivator and of the mounting therefor; Fig. 10 is a view of the same, partly in top view and partly in section, on the line $e$—$e$, Fig. 9; Figs. 11 and 12 are, respectively, a top view and a longitudinal section, both on enlarged scale, of a certain slide and locking device employed in connection with mechanism for moving the cultivator gang-frames toward or from each other; Fig. 13 is a transverse section on the line $f$—$f$, Fig. 1; Fig. 14 is a front view of part of the lever for operating the slide shown in Figs. 11 and 12; Fig. 15 is a side view, on an enlarged scale, of one of the arms used in connection with the balancing mechanism of the machine; Fig. 16 is an enlarged section on the line $g$—$g$, Fig. 1, and Fig. 17 is a perspective view of a certain saddle constituting one of the elements of the machine.

Referring in the first instance to Figs. 1 and 2 of the drawings, 1 represents a transverse bar of angle iron which is mounted, in the manner described hereinafter, upon the swinging wheels 2, and which carries the other mechanism of the machine. Securely bolted to the top of this bar 1 at a proper distance apart from one another are a pair of saddles 3, and secured in a central position upon the bar is a saddle 4, these saddles being preferably in the form of metal castings.

Projecting from each of the saddles 3 are a pair of ears 5 and between these ears is confined the rear end of a bar 6, the forward ends of the opposite bars 6 being bent inwardly and secured to the pole 7 of the cultivator whose rear end rests in and is longitudinally confined to a stirrup 8 mounted upon and projecting forwardly from a transverse angle bar 9 which rests at its opposite ends upon the bars 6 and is securely confined thereto, preferably by bending forwardly the opposite ends 10 of the vertical member of said angle bar and riveting or otherwise securing them to the inwardly extending portions of the bars 6, as shown in Fig. 1.

In depending hangers 11 secured to the bar 9 is mounted a transverse shaft 12 (Figs. 2 and 13) upon which are mounted the opposite cultivator gang-frames, each of the latter consisting of a forward member mounted so as to swing vertically upon the shaft 12 and a rear or cultivator-blade-carrying member mounted upon the forward member so as to swing laterally in respect thereto, the specific construction of the cultivator gang-frames being fully set forth hereinafter.

The method of mounting and swinging the supporting wheels 2 of the cultivator will be best understood by reference to Figs. 1, 2, 9 and 10, on reference to which it will be observed that the transverse bar 1 has at each end a depending leg consisting by preference of a strip of metal bent in the middle so as to form a top member 13 and opposite depending side members 13ª, the top member being of greater width than said side members and being secured to the bar 1 by means of hook bolts 14 which engage openings in the opposite sides of said top member and pass through opposite flanges on a yoke 15 which straddles the bar 1, the hook bolts being tightened by means of nuts 16 engaging threaded portions of said hook bolts and bearing upon the flanges of the yoke 15, as shown in Fig. 9.

Rigidly mounted between the opposite side members 13ª of the legs are upper and lower bearings 17 in which is free to turn a pivot shaft 18 whose lower end is bent outwardly and serves as the axle for the wheel 2. Secured to the pivot shaft 18 is a stirrup 19 for receiving one of the feet of the driver of the cultivator, this stirrup consisting of a bar of metal having its outer end bent around the pivot shaft 18, and then extended inwardly so as to provide an overlapping end 19ª, between which and the forward portion of the stirrup is rigidly confined a strip 19ᵇ whose outer end enters a key-way cut in the pivot bar 18, as shown in Fig. 10, thereby so connecting the stirrup to the pivot shaft that the latter can be readily turned in its bearings by pressure imparted to the stirrup.

The same bolts which confine the strip 19ᵇ between the overlapping ends of the stirrup also serve to confine to the forward face of the same a plate 20, and to the latter is bolted an upwardly extending arm 21, the upper ends of the arms of the opposite stirrups being connected together by means of a transverse bar 22 whereby the opposite stirrups are so connected as to be compelled to move in unison.

The opposite wheel carrying legs can be adjusted nearer to or farther from each other on the bar 1 by loosening the nuts 16 on the hook bolts 14 and sliding the legs and the yokes 15 in or out on the bar 1, and then again tightening said nuts 16, and in order to permit such adjustment the transverse bar 22 has at each end a series of openings for the reception of the bolt whereby it is connected to the stirrup arms 21, as shown in Fig. 1.

In order to prevent swinging of the wheels 2 by the stirrups when the cultivator is following a straight course, the bar 22 can, when desired, be locked to one of the side bars 6, the latter having a vertically adjustable pin 23 which can be caused to engage an opening in the bar 22 and thereby prevent lateral movement of said bar in either direction (see Figs. 1 and 16). The pin 23 has, as shown in Fig. 16, a vertically slotted stem which is engaged by a bolt projecting laterally from the fixed side bar 6 of the frame of the machine, this bolt being provided with a nut whereby the slotted stem of the pin can be secured to the bar 6 in any desired position of vertical adjustment of said pin.

When it is desired to prevent swinging of the wheels 2 the pin is lowered, as shown in Fig. 16, so as to engage an opening in the bar 22 and thus prevent any lateral movement of the same, but when free swinging movement of the wheels is desired the pin 23 is raised so as to be free from engagement with the bar 22 and is secured to the bar 6 in such raised position.

The driver's seat 24 is mounted at the rear end of a seat frame comprising opposite bars 25 which rest upon the top of the angle bar 1, as shown in Fig. 2, and extend forwardly beyond the same, the forward ends of said bars 25 being connected to the respective bars 6, as shown in Fig. 1, and in order to move the axles of the wheels 2 forwardly or backwardly in respect to the seat 24, so as to properly balance the machine, ears 26, at the lower ends of the wheel carrying legs, are connected by rods 27 to arms 28 carried by the shaft 12 and keyed thereto, as shown in Figs. 13 and 15, so as to move in unison.

One of the arms 28 has an upward extension 28ª, as shown in Figs. 1 and 2, so as to extend within convenient reach of the driver and this arm carries a locking bolt 29 which, by engagement with one or other of the notches in a notched segment 30, serves to lock the bars 28 and consequently the lower ends of the wheel-carrying legs in any desired position of fore or aft adjustment.

The fore and aft adjustment of the lower ends of the legs is described from the axis of the pivotal connection between the rear ends of the bars 6 and the projecting ears 5 on the saddles 3 mounted upon the bar 1.

Between an ear 5ª and a notched segment 31 on each of the saddles 3 (Fig. 17) is pivotally mounted the lower end of a lever 32, which can be locked in different positions in respect to the notched segment 31 by means of a suitable locking bolt. Each of the levers 32 has a projecting arm 33 which engages the hooked upper end of a rod 34, the lower end of the latter passing through an opening in an angle plate 35 mounted upon the respective cultivator gang-frame and having below said plate a collar 34ª or other device for engaging the plate and causing the same, and with it the cultivator gang-frame, to rise whenever the rod 34 is elevated (see Fig. 8).

A spring 36 interposed between the plate 35 and a collar 37 on the rod 34 serves to hold the cultivator gangs down to their work.

Extending between the bars 1 and 9 is a central bar 40 having a notched upper surface, and movable forwardly and backwardly on this bar is a slide 41 to which, as shown in Figs. 11 and 12, is pivoted a bolt 42 for engaging the notched upper surface of said bar 40 and thereby locking the slide 41 thereto in any desired position of longitudinal adjustment thereon. The bolt 42 is normally held in engagement with the notched upper surface of the bar 40 by means of a spring 43 interposed between an upwardly projecting arm 44 on the bolt and a forwardly projecting finger 45 at the rear end of the slide 41, as shown in Fig. 12.

Movement is imparted to the slide 41 from a lever 46 pivotally mounted on the central saddle 4 and connected to said slide by means of links 47. The lever 46 is preferably composed of a pair of bars which are spread apart at their lower ends, as shown in Fig. 14, so as to receive between them the bar 40 and a pivoted arm 48 which is connected by rods 49, respectively to the arm 44 of the locking bolt and to an operating handle 50 pivoted near the upper end of the lever 46, as shown in Fig. 2. The slide 41 is also connected by means of rods 51 to the opposite cultivator gang-frames, hence forward or backward movement of the slide 41 on the rod 40 will cause the gang-frames to be moved away from or toward each other and thus effect proper lateral setting of the gang-frames.

The construction of the cultivator gang-frames is represented in Figs. 3 to 7, on reference to which it will be observed that the forward or vertically swinging member of the gang-frame is composed of opposite bars 52 held in proper lateral relation to one another by interposed braces 53 but spread farther apart both at the front and rear ends of said member. The rear or laterally swinging and tooth-carrying portion of the gang-frame is also composed of a pair of bars 54 which, throughout the greater portion of their length, lie side by side, but at their forward ends are spread apart, as shown at 54$^a$ and 54$^b$, the spread rear ends of the bars 52 of the forward member of the frame being shown at 52$^a$ and 52$^b$.

The forward end of the bar 54$^b$ has formed thereon an eye 54$^c$ the central opening of which flares at top and bottom, as shown in Fig. 5, and receives a pair of conical bosses 55$^a$ and 56$^a$ which are formed, respectively, upon angle plates 55 and 56, said conical bosses being held in proper position vertically by means of a central bolt 57 passing therethrough, and provided with a suitable tightening nut 57$^a$.

The bar 52$^b$ of the forward member of the gang-frame is flanked on the inner side by a bar of the rear brace 53, and on the outer side by a short bar 58 which, as shown in Fig. 2, extends forwardly beyond the bent lower portion of said member of the gang-frame and constitutes an eye for engagement with the rear end of one of the rods of the draft mechanism. Transverse bolts 59 serve to secure together the bars 52$^b$, 53 and 58 and the two angle plates 55 and 56, as shown in Fig. 6.

The bar 52$^a$ of the forward member of each gang-frame is bent on a curve concentric with the pivotal axis of the hinge bolt 57, and the bar 54$^a$ of the rear member of the gang-frame is bent on a similar curve and lies adjacent to the bent portion 52$^a$, these bars having inserted between them, however, a small curved plate 60 flanged at top and bottom, as shown at 61 in Fig. 7, so as to overlap and underlap the bars 52$^a$ and 54$^a$ and thus retain them in their proper vertical position.

A clamping bolt 62 passes through an opening in the bar 52$^a$, through a similar opening in the plate 60 and through a slot 63 in the bar 54$^a$, as shown in Fig. 4, so as to permit lateral swinging of the rear member of the gang-frame on its pivotal axis and locking of said member in its different positions of lateral adjustment. A short bolt 64 also passes through the plate 60 and bar 52$^a$, as shown in Fig. 7, so as to aid in confining said plate to the bar 52$^a$, but this bolt is not passed through the bar 54$^a$ and consequently the slot 63 in said bar is so short that it does not materially weaken the same.

I claim:

1. A cultivator gang-frame comprising forward and rear members each composed of a pair of bars disposed side by side, one bar of each member having a pivotal connection with the corresponding bar of the other member, and said pivotal connection consisting of an eye at the end of one bar, and upper and lower angle plates secured to the end portion of the other bar and having, respectively, upper and lower pivot bosses entering said eye.

2. A cultivator gang-frame comprising forward and rear members each composed of a pair of bars disposed side by side, one bar of each member having a pivotal connection with the corresponding bar of the other member, and said pivotal connection consisting of an eye at the end of one bar, said eye being conically flared at top and bottom, and angle plates secured to the rear end of the other bar and having conical pivot bosses adapted to the conically flaring portions of said eye.

3. A cultivator gang-frame comprising forward and rear members each composed of a pair of bars disposed side by side, one bar of each member having a pivotal connection with the corresponding bar of the other member, and said pivotal connection consisting of an eye at the end of one bar, said eye being conically flared at top and bottom, angle plates secured to the rear end of the other bar and having conical pivot bosses adapted to the conically flaring portions of said eye, and a bolt passing through said bosses and serving to retain them in position within the eye.

4. A cultivator gang-frame comprising forward and rear members each composed of a pair of bars disposed side by side, one bar of each member having a pivotal connection with the corresponding bar of the other member, and the other bar of each member having a curved portion concentric with the axis of said pivot, and a curved plate interposed between the curved portions of the bars and having top and bottom flanges whereby said curved portions of the bars and plate are maintained in proper vertical relation to one another.

5. A cultivator gang-frame comprising forward and rear members each composed of a pair of bars disposed side by side, one bar of each member having a pivotal connection with the corresponding bar of the other member, and the other bar of each member having a curved portion concentric with the axis of said pivot, a curved plate interposed between the curved portions of the bars and having top and bottom flanges whereby said curved portions of the bars and plate are maintained in proper vertical relation to one another, and a confining bolt passing through an opening in the curved portion of a bar of one member, through an opening in the plate and through a slot in the curved portion of the bar of the other member, so as to provide for lateral adjustment of one member in respect to the other and for securing it in different positions of such adjustment.

6. A cultivator gang-frame comprising forward and rear members each composed of two bars disposed side by side, a pivotal connection between the ends of corresponding bars of the forward and rear members, curved and overlapped portions of the other bars of said members concentric with said pivot, a plate interposed between said curved portions of said bars, a confining bolt passing through said plate and through the curved portions of both bars, and another bolt passing through said plate and through the curved portion of but one of said bars.

7. The combination of a transverse bar constituting part of the main frame of a cultivator, with opposite wheel-carrying members each comprising a single bar bent to form a central crown portion and opposite depending side legs, said central crown portion being fitted to said transverse bar, and means for securing it thereto.

8. The combination of a transverse bar constituting part of the frame of the cultivator, wheel-carrying legs depending from said bar, pivot shafts for said wheels, each having a keyway therein, bearings for said pivot shafts carried by said legs, wheel-swinging stirrups, and means for mounting each of said stirrups upon its corresponding wheel pivot shaft, said means comprising a bent end of the stirrup bar embracing said pivot shaft and having one portion overlapping another, a key plate engaging said keyway in the pivot shaft, and means for confining said key plate between the overlapping portions of the stirrup bar.

9. The combination of the side bars of a cultivator frame, a transverse bar having depending legs, means for mounting the wheels in said legs so as to permit them to swing, wheel swinging stirrups, a bar connecting the same, and a vertically adjustable pin carried by one of the side bars of the frame and adapted to engage said connecting bar so as to lock the stirrups in position.

10. The combination of right and left hand cultivator gang-frames, a shaft upon which said frames are slidably mounted, a longitudinal bar, a slide mounted thereon, rods connecting said slide to said cultivator gang-frames, a lever for moving said slide forwardly and backwardly on said bar, and means for locking the slide to said bar in its different positions of longitudinal adjustment thereon, said means comprising notches in the bar, a swinging bolt pivotally mounted on the slide and adapted to engage said notches, an operating handle pivotally mounted upon the slide-operating lever, and connections between said handle and said locking bolt.

11. The combination of the notched bar, a slide longitudinally movable thereon, and having an upwardly projecting finger, a locking bolt pivoted to said slide and having an upwardly projecting arm thereon, and a spring interposed between said arm and finger and tending to move the locking bolt into engagement with the notched bar.

12. The combination of the central longitudinal notched bar, a slide movable back and forth thereon, a locking bolt on said slide, a slide operating lever, links connecting the same to the slide, and a bolt-operating device having as an element a pivoted arm, said actuating lever being composed of two bars disposed closely side by side through the upper portion of the lever but spread apart throughout its lower portion, so as to receive them between the notched bar and the pivoted arm of the bolt connection.

13. The combination in a riding cultivator of the fixed frame, the wheels, wheel-carrying legs pivoted at their upper ends and adjustable forwardly and backwardly at their lower ends, a rock shaft mounted on the fixed frame in advance of the wheels, arms on said rock shaft connected to the lower ends of the legs, and cultivator gang-frames hung on said rock shaft.

14. The combination, in a riding cultivator, of the fixed frame, the wheels, wheel-carrying legs pivoted at their upper ends and adjustable forwardly and backwardly at their lower ends, a rock shaft mounted on the fixed frame in advance of the wheels, arms on said rock shaft connected to the lower ends of the legs, cultivator gang-frames hung on said rock shaft, and means for moving said gang-frames toward and from each other on said shaft.

In testimony whereof, I have signed my name to this specification, in the presence of two subscribing witnesses.

LELAND WILLIS.

Witnesses:
E. H. SHELDON,
B. FRANKLIN CHASE.

Copies of this patent may be obtained for five cents each, by addressing the "Commissioner of Patents, Washington, D. C."